M. METZGER.
FILM JOINING APPARATUS.
APPLICATION FILED FEB. 16, 1917. RENEWED MAY 1, 1919

1,324,686.

Patented Dec. 9, 1919.
4 SHEETS—SHEET 2.

Inventor
M. Metzger
By Fetherstonhaugh & Co
Attys

M. METZGER.
FILM JOINING APPARATUS.
APPLICATION FILED FEB. 16, 1917. RENEWED MAY 1, 1919

1,324,686.

Patented Dec. 9, 1919.
4 SHEETS—SHEET 3.

Inventor
M. METZGER
By Fahnestock &Co
Attys.

M. METZGER.
FILM JOINING APPARATUS.
APPLICATION FILED FEB. 16, 1917. RENEWED MAY 1, 1919
1,324,686.
Patented Dec. 9, 1919.
4 SHEETS—SHEET 4.
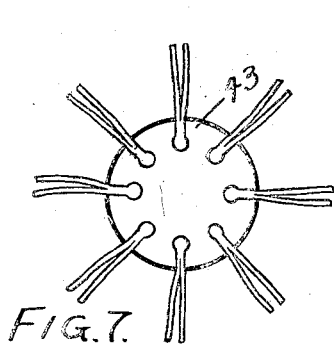
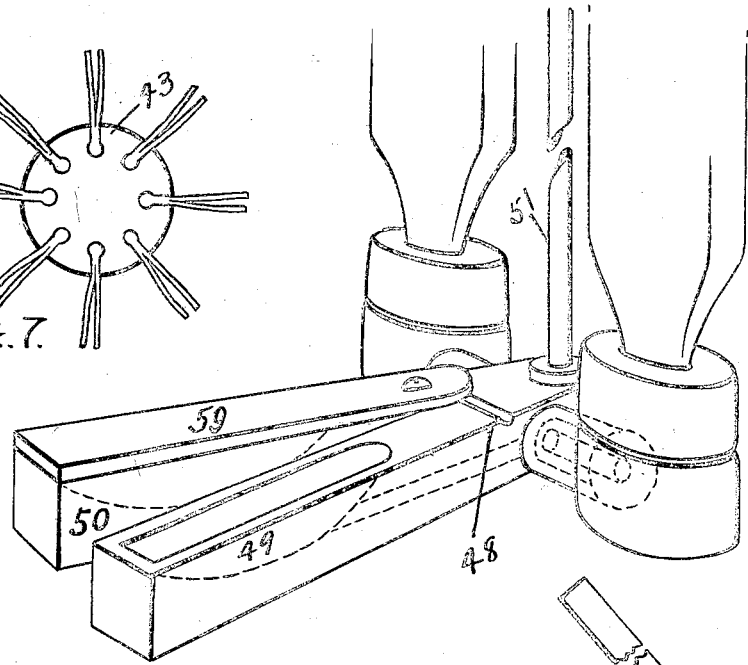
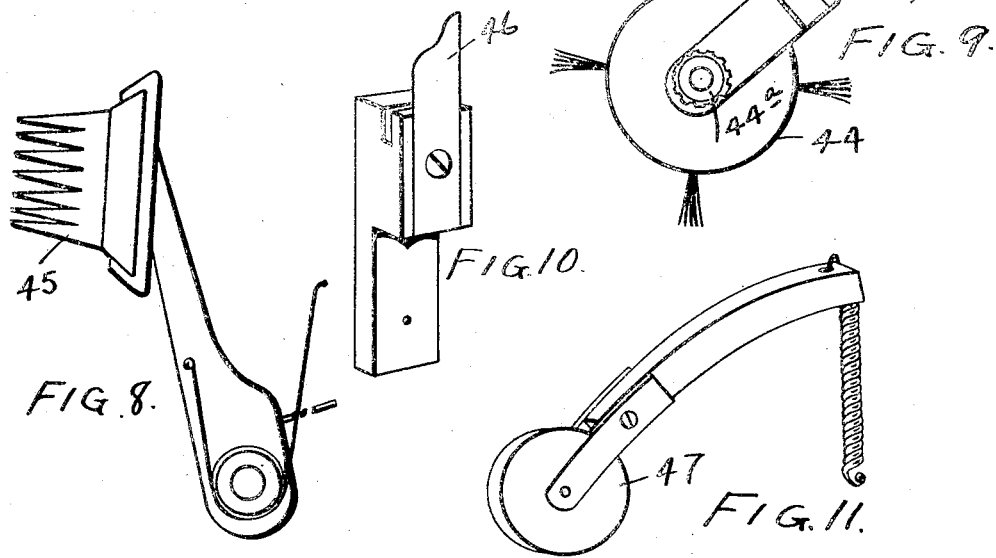
Inventor
M. Metzger
By Fetherstonhaugh & Co
Attys

UNITED STATES PATENT OFFICE.

MAURICE METZGER, OF MONTREAL, QUEBEC, CANADA.

FILM-JOINING APPARATUS.

1,324,686.  Specification of Letters Patent.  Patented Dec. 9, 1919.

Application filed February 16, 1917, Serial No. 149,108. Renewed May 1, 1919. Serial No. 293,946.

*To all whom it may concern:*

Be it known that I, MAURICE METZGER, a subject of the King of Great Britain, and resident of the city of Montreal, in the Province of Quebec and Dominion of Canada, have invented certain new and useful Improvements in Film-Joining Apparatus, of which the following is a full, clear, and exact description.

This invention relates to a machine for joining or splicing moving picture films and the like.

The pictures in these films are contained in a long strip or film in successive arrangement, the film being perforated along its edges with suitably spaced apertures that engage the sprocket wheels of the exhibiting machine. It frequently happens that the film becomes torn or broken, making it necessary to re-join the severed ends before the film can be used again. This operation of joining or splicing films requires that the edges be trimmed or cut evenly, so that a perfect joint and perfect registration of the perforations may be obtained. It also requires the removal of the gelatin from the under edge of one of the pieces to be joined, and the application of a cementing material thereto during which operation the ends of the films to be joined must be held in proper relation.

The main object of my invention is to provide a machine which can be operated either by hand or by means of a suitable motor, preferably the latter, which will automatically cut or trim the ends of the films, moisten same with a suitable liquid, remove the gelatin from the edge, apply a coating of cementing material, overlap the edges and hold same in position until a proper joint or splice has been made, the entire operation being performed automatically by the machine without any assistance from the operator after the machine has been set in motion.

My invention consists essentially of a suitable frame for holding the machine, having a top plate with a slot and film tables thereon, the latter being slidable and provided with means for holding the film in position. In the frame is a gear driven disk, carrying a knife for cutting or trimming the edges of the films, one or more scrubbers for moistening the gelatin on the adjacent under edges of the film, one or more brushes for removing the gelatin, one or more driers or burnishers for drying the cleaned edges, a cement brush for applying the paste or cement, and a presser roll for pressing the edges of the film together. The disk is revolved at a suitable speed, preferably by means of a motor, and a double oscillating trough having a water cell and a cement cell is provided into which the brushes or scrubbers are dipped.

In the drawings which illustrate my invention:—

Fig. 6 is a perspective view of the liquid troughs.

Fig. 7 is a detail view of the buffer brush.

Fig. 8 is a detail view of a scrubbing brush.

Fig. 9 is a detail view of the cement brush.

Fig. 10 is a detail view of the knife.

Fig. 11 is a detail view of the presser-wheel.

Figure 1:
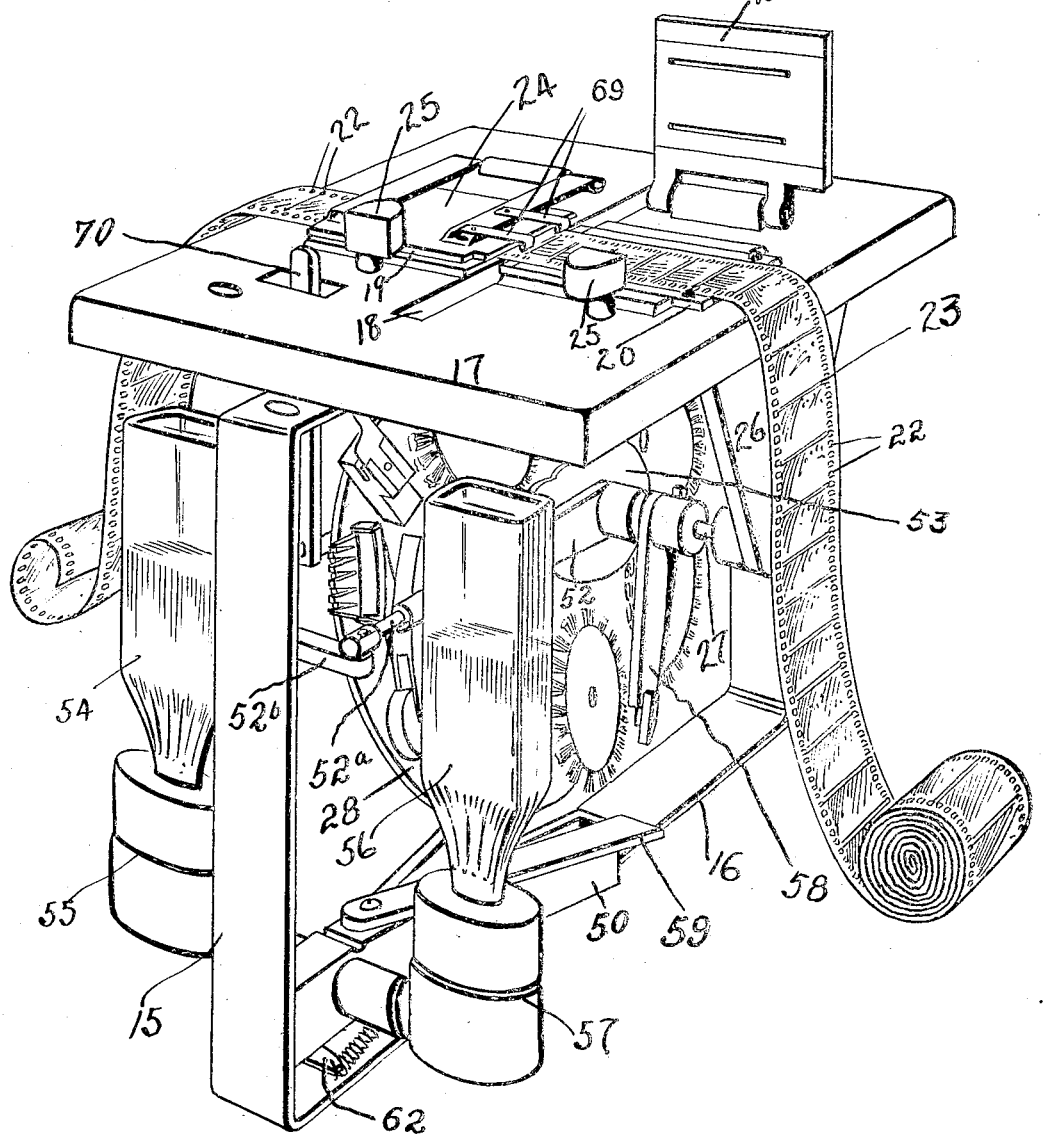
Figure 1 is a perspective view in elevation of my machine.

Referring more particularly to the drawings, 15 designates a suitable rectangular frame, provided with a base plate 16 and a top plate 17. This top plate has a transverse slot 18 extending across same, and a pair of film tables 19 and 20, these film tables having a limited sliding movement to permit the joined ends of the films to be overlapped. The film table 19 is provided with pins 21 which engage the apertures or perforations 22 in the film 23, to hold said film in position. Hinged clamps 24 are also adapted to hold the films firmly in place on the film tables, and these clamps are held in position by the thumb nuts 25.

In order to match the films, so that they may be joined and overlapped at the proper point, I provide one of the film tables 19 with an adjusting gage in the form of a screw 19ª, provided with a block 19ᵇ, which is secured to the table 19 through a slot in the table 17. The screw 19ª is preferably located on the under side of the top table 17, extending through the side flange and being adjustable by means of a thumb nut 19ᶜ. By means of this screw, the table 19 may be given a limited movement in order that the film ends may be properly matched.

Figure 2:
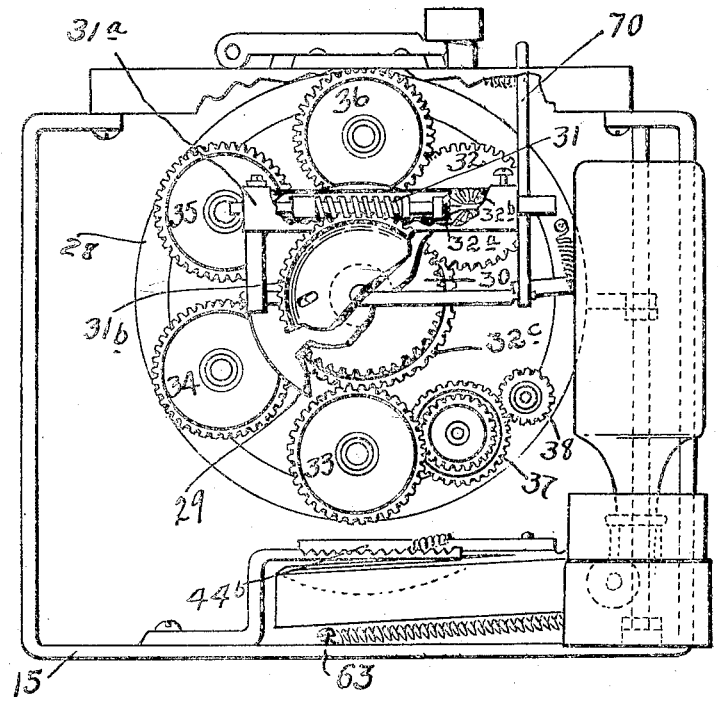
Fig. 2 is a side elevation of the machine showing the operating gears.

On the under side of the top plate is mounted a bracket 26 carrying a shaft 27, upon which the rotating disk 28 is carried. This disk may be driven by any suitable means, either by hand or by a small motor, preferably the latter. In Fig. 2, I have illustrated one form of driving mechanism, in which 29 designates the power wheel adapted to be connected to a suitable motor by belt or other means. A gear wheel 30 meshing with a second gear wheel 32 drives the worm 31 through the medium of the bevel gears 32ᵃ and 32ᵇ. The gear wheel 32, which carries the bevel gear 32ᵇ meshing with the bevel gear 32ᵃ carried by the worm shaft 31, is mounted on a suitable bracket 31ᵃ secured to the bracket 26. The drive wheel 29 with the gear wheel 30 are loosely mounted on the shaft 27, while the gear wheel 31ᵇ is fixed to the shaft 27. This gear wheel 31ᵇ coöperates with the worm 31, and is driven by the worm at a low ratio of speed. The wheel 31ᵇ being fixed to the shaft 27 and traveling at a low rate of speed, carries the brush carrying disk 28, which is also fixed on the main shaft. While the disk is being rotated, it carries a train of gear wheels 33, 34, 35, 36, 37 and 38, these gears being rotated by intermeshing with a gear wheel 32ᶜ mounted loosely on the shaft adjacent the disk. On the opposite side of the rotating disk 28 from the gear train are a series of brushes and buffing or scrubbing devices, which are rotated by means of the gear train. The wire cleaning brushes 39, 40, 41 and 42 are rotated by means of the wheels 33, 34, 35 and 36 respectively, while the buffer wheel 43 is operated by means of the small gear wheel 38, which is connected to the gear wheel 33 through the gear train 37, as clearly shown in Fig. 2. The cement brush 44 for applying the cement or glue is actuated by means of the small gear wheel 44ᶜ. This cement brush is designed to rotate only when receiving a supply of cement or glue from the trough and when applying the cement to the under side of the film. During transit from the bottom to the top of the machine, the cement brush is stationary with relation to the disk 28. This cement brush, however, as it travels through the cement trough is rotated by means of the gear wheel 44ᵃ, engaging the toothed rack 44ᵇ located on the upper side of the cement trough 48 hereinafter referred to. Also when the cement brush reaches the top of the machine, and is about to apply cement to the under side of the film, the gear wheel 44ᵃ engages the toothed rack 44ᶜ mounted on the under side of the table 17 adjacent the slot 18, and is rotated thereby. Mounted upon the rotating disk are a series of scrubbing brushes 45, 45ᵃ, 45ᵇ and 45ᶜ, preferably of rubber, which are adapted to moisten the under side of the film, so that the gelatin may be more easily removed therefrom. The disk also carries a knife 46 which is adapted to operate in the slot 18 to trim the edges of the films. A presser wheel 47 is mounted on the disk, which is adapted to hold the overlapped ends of the films firmly together after the glue has been applied.

In order to provide means for automatically moistening the scrubbing brushes and for applying cement to the cement brush, I provide a bifurcated oscillating trough 48 having a water cell 49 on one side and a cement cell 50 on the other side. This trough is adapted to oscillate on the post or spindle 51, motion being imparted to the shaft by means of the lever 52, which carries a link 52ᵃ connected to the arm 52ᵇ fastened to the spindle 51. This link 52ᵃ is actuated by means of the cam 53 mounted on the main shaft to give the spindle a slight axial movement, allowing the trough to oscillate underneath the disk. This trough is operated so that the scrubbing or moistening brushes 45, 45ᵃ, 45ᵇ and 45ᶜ will enter the water cell of the trough, and become moistened with water as they pass the under side of the disk, but as soon as the cement or glue brush 44 passes to the under side of the wheel, the cement or glue cell will be alined with the wheel, so that glue or cement may be dipped up by the cement brush. The upper side of the trough on the cement cell is provided with a toothed rack 44ᵇ adapted to rotate the cement brush while it is traveling through the trough, as above described. Water is fed to the water cell by means of any suitable bottle reservoir 54, which keeps the water cell at a proper level by means of any well known automatic valve 55, such as that used for mineral water bottle fountains. Similarly, glue or cement is fed to the cement cell by means of the bottle reservoir 56, which is provided with a similar automatic fountain valve 57. The cement cell may be provided with a pivoted cover plate 59 held normally in position on the cover by means of a spring 60, to prevent evaporation of the glue. A spring 61, secured at one end to an arm 62 mounted on the spindle 51 and secured at the opposite end 63 to the frame 15, is adapted to hold the trough normally in proper position.

In order to provide means for automatically overlapping the ends of the films, as soon as the cement is applied, the film table 20 is provided with a pair of springs 64, secured at one end to the under side of the film table and at the opposite end to the under side of the top plate to draw the film table 20 toward the slot 18. While the several operations of cutting, moistening, brushing and cementing the film are being performed the table is held by a catch 65 pivoted to the underside of the top plate and engaging a lug 66 on the underside of the table. As soon, however, as the cement has been applied, a lever arm 58 carried upon the main shaft 27 is timed to strike the catch 65 and disengage it from the lug 66. As soon as the lever 58 moves the catch 65, the springs 64 draw the table 20, upon which one of the films is mounted, toward the slot, carrying the film ends into overlapped relation. This film table 20 is also provided on its outer end with a lip 67 secured to the table by coil springs 68, which permit the lip to have a slight vertical movement. The cover plate 24 on the opposite side is provided with a pair of springs 69, which when the cover plate is clamped in position press on the lip, thus forcing one of the film ends to slide under the other.

The operation of the machine is as follows:—

Figure 3:
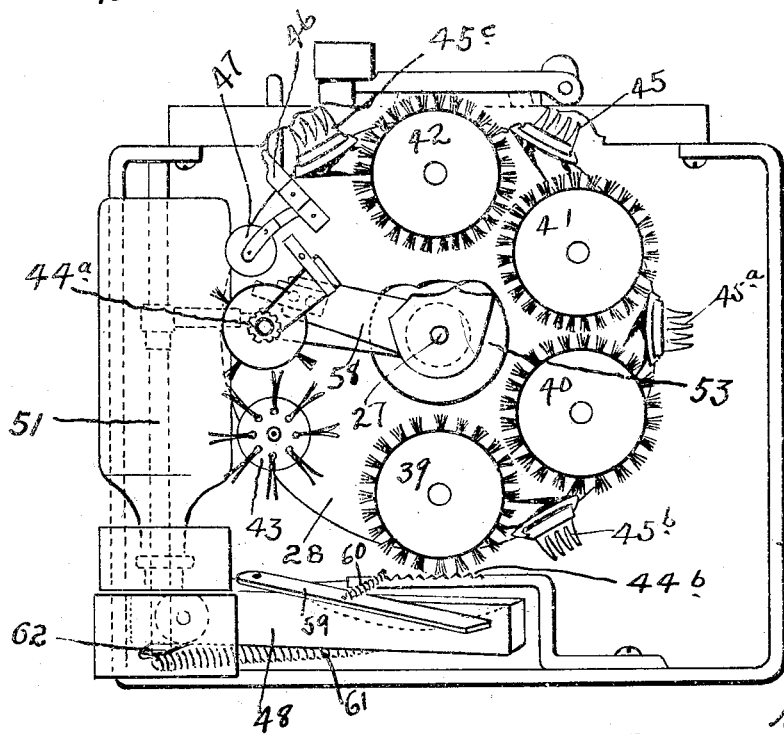
Fig. 3 is an elevation of the reverse side of the machine showing the disk, carrying the brushes, etc.
Figure 4:
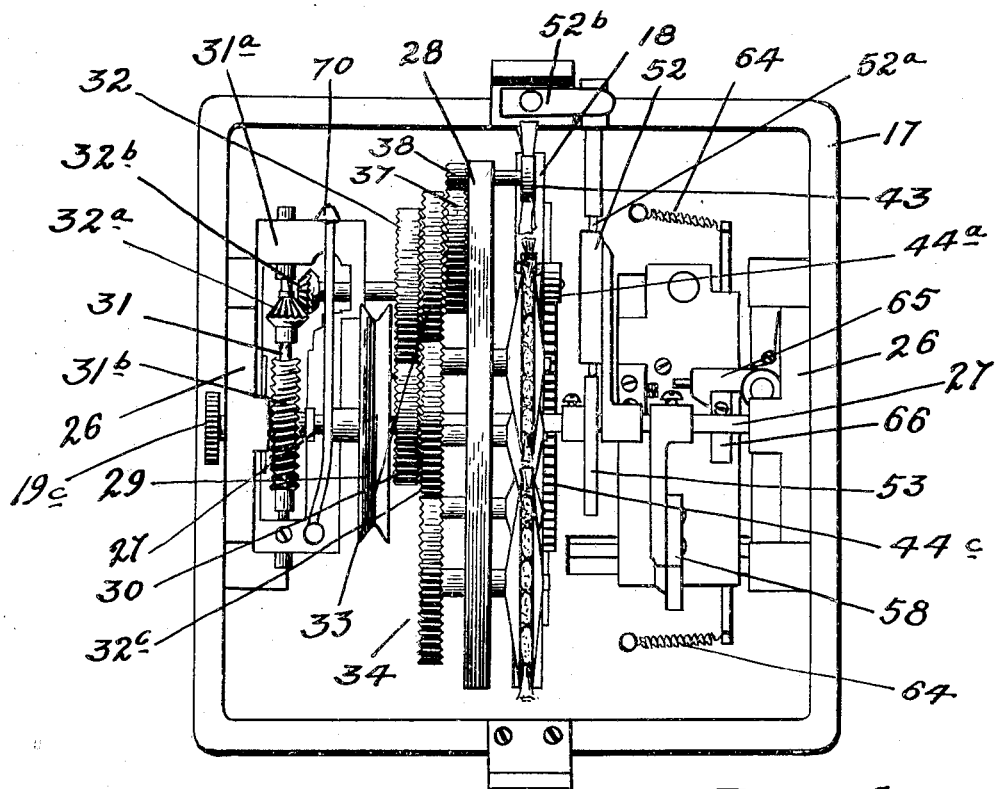
Fig. 4 is a perspective view showing the under side of the table.
Figure 5:
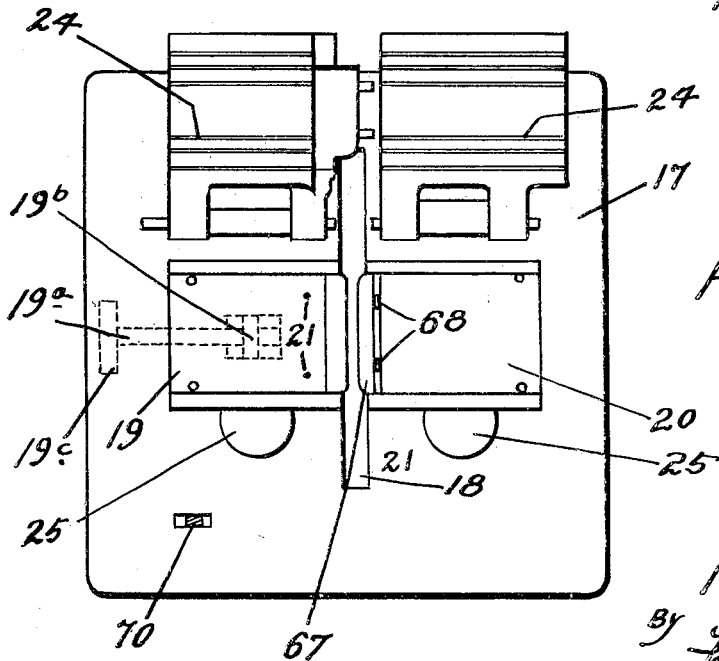
Fig. 5 is a top plan view of the machine.

The film ends are superposed and overlapped one on the table 19 and the other on the table 20, both with the emulsion side down. The pins in the table 19 are engaged in the perforations along the edges of the film, and the clamps 24 are closed down and held in position by the thumb nuts 25. The power is then turned on and the disk 28 is rotated. The knife 46 having its point extending through the slot 18 in the top plate cuts both films off square along one edge of the slot. The rubber brush 45, having been previously dipped in the water cell of the oscillating trough, then passes the film and moistens the emulsion on the under edge of same. This moistening brush may either be located on the disk in front of the knife or behind it, as is found most convenient. The revolving brush 42, which is provided with small wire brushes, next engages the under side of the moistened film to remove part of the emulsion therefrom. A second rubber brush 45ª, which has also been dipped in the water cell, again applies moisture to the emulsion and the succeeding wire brush 41 cleans off more of the gelatin. This operation is followed in exactly the same manner by third and fourth brushes 45ᵇ and 45ᶜ and wire brushes 40 and 39, which entirely remove the gelatin or emulsion from the film. The operation may be clearly followed by reference to Fig. 3. The film is then operated upon by means of the dry buffer or burnisher 43, which travels between the water cell and the cement cell, as the trough oscillates, and consequently remains dry to polish the under side of the film. Following the burnishing brush 43 is the cement brush 44, which has entered the glue or cement cell of the trough, as the latter oscillated into position and has been rotated during its travel through the cement cell by means of the pinion 44ª coöperating with the toothed rack 44ᵇ. This cement brush is not rotated during transit from the trough to the film, but when it reaches the film, the pinion 44ª is engaged by the toothed rack 44ᶜ on the under edge if the table, so as to rotate the brush, while the glue is being applied to the film. After this operation, the lever arm 58 strikes the catch 65 pivoted on the under side of the top table, and releases the film table 20, which by means of the springs 64 is moved slightly forward, so that one film end is carried under the other cemented end of the film. The springs 69 acting on the lip 67 insure this movement. The presser roll 47 then follows, pressing upwardly upon the cemented edges of the film to make the joint firm. The machine is then stopped automatically by means of any suitable shifting lever 70, adapted to operate and to start and stop the machine in any well known manner.

While I have illustrated and described one form of machine for automatically cutting, cleaning, cementing, overlapping and joining the edges of films, I do not wish to limit myself to the precise form shown, as many changes and modifications may be made without departing from the spirit of my invention.

Having thus described my invention, what I claim is:—

1. A machine for joining films, comprising a pair of tables for holding the film ends, and means for automatically and successively cutting, scraping, washing, cementing and overlapping the film ends to form an overlapped joint.

2. A machine for joining films, comprising a pair of tables for holding the film ends, and means for automatically and successively cutting the film, cleaning the emulsion from the under side washing and drying same, applying cement, overlapping the ends, and pressing the overlapped ends together to form a cemented joint.

3. A machine for joining films, comprising a pair of tables for holding the film ends, means for cutting or trimming the ends of the films, means for moistening and cleaning the gelatin from the under side of the film, means for applying cement to the cleaned portion, and means for automatically moving one of the film tables to allow the cemented edges to form an overlapped joint.

4. In a film joining machine, a pair of tables for holding the adjacent ends of the films, means for cutting and trimming the film ends, means for successively moistening, brushing and polishing the under side of the film to thoroughly clean the gelatin therefrom, means for applying a coating of cement to the cleaned edge of the film, means for automatically moving one of the film tables to allow the edges of the films to overlap, and means for pressing the overlapped edges together to form a cemented joint.

5. A film splicing machine, comprising a pair of tables for holding the film ends, a rotating disk, a knife mounted on said disk for trimming the film ends, moistening and brushing devices mounted on the disk adapted to clean the film edges, a cementing device mounted on said disk, and an oscillating liquid trough mounted below the disk.

6. A film joining machine, comprising a pair of tables for holding the film ends, a rotating disk provided with means for cutting, cleaning and applying cement to the adjacent edges of the film, a liquid trough mounted below said disk, and means for oscillating said trough to apply liquid to the cleaning and cementing devices.

7. In a film joining machine, a pair of tables for holding the film ends, a rotating disk, a knife carried by said disk, a series of cleaning and scrubbing brushes carried by the disk, a brush for applying cement also carried by said disk, means for automatically supplying liquid to the scrubbing brushes to moisten the film ends, means for automatically supplying cement to the cement brush, and means for automatically overlapping the cemented edges of the films to form an overlapped joint.

8. A machine of the character described, comprising a pair of tables for holding the film ends, a rotatable disk, and means carried by the disk for automatically cutting the ends of the film, removing the gelatin therefrom, applying a coating of cement, moving one of the tables to allow the abutting edges of the film to overlap, and for pressing the cemented edges of the film together.

9. A machine of the character described, comprising a pair of adjustable tables for holding the film ends, a rotatable disk, an oscillating liquid trough mounted below said disk, means for feeding cement into one side of said trough and water into the other side, a knife for cutting or trimming the edges of the film, brushes adapted to dip into the water trough for moistening the film, brushes carried by the disk adapted to remove the gelatin from the film, a polisher carried by said disk, a cement brush carried by the disk, means for applying cement from the cement trough to said brush, means for automatically moving one of the tables to allow the edges of the film to overlap, and a presser roll carried by the disk for pressing the cemented edges of the film together.

10. A machine of the character described, comprising a pair of adjustable tables for holding the adjacent ends of the films, a rotatable disk carrying cutting, moistening, cleaning and cementing means for the film ends, a movable lip carried by one of said tables, and means acting on said lip for forcing the edge of one film under the edge of the other film.

11. A machine of the character described, comprising a pair of tables for holding the film ends, a lip carried by one of said tables for applying pressure to one end of the film, a rotatable disk, means carried by said disk for successively cutting the ends of the film, cleaning the gelatin therefrom, applying a coating of cement, and overlapping the film ends to make a cemented joint, a liquid trough, and means for oscillating said trough to apply water to the cleaning devices and glue to the cementing device.

12. In a film splicing machine, means for cleaning, and cementing the film ends, and means for successively supplying cleaning and cementing fluids to said cleaning and cementing means.

13. In a film splicing machine, film cleaning and film cementing devices traveling in a common path, separate containers for cleaning and cementing fluids, and means for moving said containers into and out of the path of the cleaning and cementing devices.

14. In a film splicing machine, film holding means, film cleaning and film cementing devices, containers for film cleaning and film cementing fluids, means carrying said cleaning and cementing devices from receptacles to the film holder, and means for shifting the receptacles whereby the cement receptacle is brought into the path of the cementing device, and the cleaning fluid receptacle into the path of the cleaning device.

15. In a film splicing apparatus, film cutting, cleaning, burnishing, cementing and pressing devices movable in a common path, a receptacle having compartments for cleaning fluid and cement, and means for shifting said receptacle to bring the cement compartment thereof into the path of said devices only during the passage of the cementing device through the zone of the receptacle, and the cleaning fluid compartment into the path of said devices only during passage of the cleaning devices through the zone of the receptacle, and both compartments out of the path of said devices during passage of the cutting, burnishing and pressing devices in the zone of said receptacle.

16. In a film splicing apparatus, film cleaning, burnishing and cementing devices, a cellular fluid receptacle, means for shifting said receptacle to bring certain cells thereof into the path of the cleaning and cementing devices, and for moving the receptacle out of the path of the burnishing device.

17. A machine of the character described, comprising a pair of tables for holding the film ends, means for successively cutting, moistening, cleaning and applying cement to the film ends, a movable lip carried by one of the tables, and means acting on said lip for overlapping the abutting edges of the films.

18. In a film splicing machine, a rotating disk, and means carried by the disk for successively trimming, moistening, cleaning, drying and applying cement to the film.

19. In a film splicing machine, film moistening and film cementing devices traveling in a common path, separate containers for moistening and cementing fluids, and means for moving said containers into and out of the path of the moistening and cementing devices.

In witness whereof I have hereunto set my hand.

MAURICE METZGER.